US008798843B2

(12) United States Patent
Sakai et al.

(10) Patent No.: US 8,798,843 B2
(45) Date of Patent: Aug. 5, 2014

(54) VEHICLE DIAGNOSING APPARATUS

(75) Inventors: Kazumori Sakai, Utsunomiya (JP); Taku Makita, Utsunomiya (JP); Hiroki Hashimoto, Saitama-ken (JP); Yuichiro Ikeda, Utsunomiya (JP); Yosuke Morita, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 627 days.

(21) Appl. No.: 12/947,178

(22) Filed: Nov. 16, 2010

(65) Prior Publication Data

US 2011/0118933 A1 May 19, 2011

(30) Foreign Application Priority Data

Nov. 19, 2009 (JP) ................................ 2009-264218

(51) Int. Cl.

*G01M 17/00* (2006.01)
*G06F 7/00* (2006.01)
*G06F 11/30* (2006.01)
*G07C 5/00* (2006.01)
*G07C 5/08* (2006.01)

(52) U.S. Cl.

CPC .............. *G07C 5/008* (2013.01); *G07C 5/0808* (2013.01); *G07C 5/085* (2013.01)
USPC ......................... 701/29.1; 701/31.4; 701/34.3

(58) Field of Classification Search

USPC ........ 701/1, 102, 114, 2, 29, 29.1, 29.2, 29.3, 701/29.5, 29.6, 31.4, 32.7, 33, 33.4, 36, 701/31.5, 34.3; 714/33, 43, 57; 370/349, 370/401, 463, 466; 709/203, 225, 251
See application file for complete search history.

(56) References Cited

U.S. PATENT DOCUMENTS 5,968,108 A 10/1999 Takakura et al.
6,134,488 A 10/2000 Sasaki et al.
(Continued)

FOREIGN PATENT DOCUMENTS

CN 1787028 6/2006
CN 1945257 4/2007
(Continued)

OTHER PUBLICATIONS

Chinese Patent Publication No. 102072822B with partial English translation, 2 pages.

(Continued)

*Primary Examiner* — Tuan C. To
*Assistant Examiner* — Isaac Smith
(74) *Attorney, Agent, or Firm* — Rankin, Hill & Clark LLP

(57) ABSTRACT

After a request for first data is received from a first diagnostic unit, when a request for second data is received from a second diagnostic unit, if the first data and the second data of the same type, then a communication unit requests the electronic control unit to send the same type of data, and sends the same type of data received from the electronic control unit to the first diagnostic unit and the second diagnostic unit. If the first data and the second data are of different types, then the communication unit requests the electronic control unit to send the first data and the second data, receives the first data and the second data all together from the electronic control unit, sends the received first data to the first diagnostic unit, and sends the received second data to the second diagnostic unit.

5 Claims, 10 Drawing Sheets

(56) References Cited

U.S. PATENT DOCUMENTS

| | | | | |
|---|---|---|---|---|
| 6,360,145 | B1 * | 3/2002 | Robinson | 701/31.5 |
| 6,732,031 | B1 * | 5/2004 | Lightner et al. | 701/31.4 |
| 7,447,576 | B2 * | 11/2008 | Ban et al. | 701/36 |
| 7,912,597 | B2 | 3/2011 | Yamada | |
| 2002/0059020 | A1 | 5/2002 | Abe et al. | |
| 2006/0293811 | A1 * | 12/2006 | Andreasen et al. | 701/29 |

FOREIGN PATENT DOCUMENTS

| | | | |
|---|---|---|---|
| CN | 1996037 | | 7/2007 |
| EP | 0793084 | A2 | 9/1997 |
| JP | 09-210865 | | 8/1997 |
| JP | 09-226482 | | 9/1997 |
| JP | 10-253505 | | 9/1998 |
| JP | 10-283016 | | 10/1998 |
| JP | 11-037903 | | 2/1999 |
| JP | 2000-121684 | | 4/2000 |
| JP | 2002-091545 | | 3/2002 |
| JP | 2008-032519 | | 2/2008 |
| JP | 2009-192219 | | 8/2009 |

OTHER PUBLICATIONS

Japanese Notice of Allowance dated Jul. 9, 2013 with partial English Translation, 4 pages.

* cited by examiner

COMPARATIVE EXAMPLE

PRESENT EMBODIMENT

VEHICLE DIAGNOSING APPARATUS

CROSS-REFERENCE TO RELATED APPLICATION

This application is based upon and claims the benefit of priority from Japanese Patent Application No. 2009-264218 filed on Nov. 19, 2009, of which the contents are incorporated herein by reference.

BACKGROUND OF THE INVENTION

1. Field of the Invention

The present invention relates to a vehicle diagnosing apparatus for communicating with an electronic control unit mounted on a vehicle from outside the vehicle and determining whether or not the vehicle has passed with respect to a plurality of diagnostic items based on various data transmitted from the electronic control unit.

2. Description of the Related Art

When vehicles with electronic control units (ECUs) installed therein are manufactured, they are diagnosed to check if the ECUs and various devices electrically connected thereto function properly or not in a final inspection process after the vehicles have been assembled. Such a diagnostic process is carried out on a vehicle by communicating with a vehicle diagnostic apparatus (tester) that is positioned outside the vehicle and connected to the ECU in the vehicle (see, for example, Japanese Laid-Open Patent Publication No. 2000-121684 (hereinafter referred to as JP 2000-121684 A) and Japanese Laid-Open Patent Publication No. 09-210865 (hereinafter referred to as JP 09-210865 A)).

According to JP 2000-121684 A, in order for a disclosed inspection system to shorten its inspection time, data detected by an ECU (10) are temporarily stored in a RAM (23) and then output all together to an inspection tester (100) (see the abstract of JP 2000-121684 A). More specifically, according to JP 2000-121684 A, the inspection system enters an inspection mode in response to a communication request sent from the inspection tester to the ECU (see paragraph [0017]), and the ECU stores various data in the RAM (see paragraphs [0028], [0030] through [0032]). In response to the communication request from the inspection tester, the data stored in the RAM are sent from the ECU to the inspection tester (see paragraphs [0039], [0043]).

According to JP 2000-121684 A, as described above, the ECU sends the data for inspection to the inspection tester in response to the communication request from the inspection tester. However, the communication request from the inspection tester is effective only to put the inspection system into an inspection mode (see paragraph [0017]), but is not capable of requesting the ECU to send any particular detected data.

Consequently, the inspection system disclosed in JP 2000-121684 A is not applicable where the inspection tester is to execute a plurality of diagnostic programs concurrently with each other and each of the diagnostic programs is to acquire the detected data from the ECU.

The inspection system disclosed in JP 2000-121684 A is designed to send the detected data stored in the RAM from the ECU to the inspection tester, i.e., to reduce communication loads at the time the detected data are sent from the ECU to the inspection tester. However, the disclosed inspection system does not take into account any attempts to reduce communication loads at the time data are sent from the inspection tester to the ECU.

SUMMARY OF THE INVENTION

It is an object of the present invention to provide a vehicle diagnosing apparatus which is capable of reducing communication loads required by the vehicle diagnosing apparatus and an electronic control unit even when a plurality of diagnostic programs requests the electronic control unit to send data.

According to the present invention, there is provided a vehicle diagnosing apparatus for communicating with an electronic control unit mounted on a vehicle from outside the vehicle and determining whether or not the vehicle has passed with respect to a plurality of diagnostic items based on various data transmitted from the electronic control unit, the vehicle diagnosing apparatus comprising a first diagnostic unit for executing a first diagnostic program, a second diagnostic unit for executing a second diagnostic program which is different from the first diagnostic program, and a communication unit for communicating with the electronic control unit, wherein after the communication unit has received a request for requesting the electronic control unit to send first data, from the first diagnostic unit, when the communication unit has received a request for requesting the electronic control unit to send second data, from the second diagnostic unit, if the first data and the second data are of the same type, then the communication unit requests the electronic control unit to send the same type of data, and sends the same type of data received from the electronic control unit, to the first diagnostic unit and the second diagnostic unit, and if the first data and the second data are of different types, then the communication unit requests the electronic control unit to send the first data and the second data, receives the first data and the second data all together from the electronic control unit, sends the received first data to the first diagnostic unit, and sends the received second data to the second diagnostic unit.

With the above arrangement, when the diagnostic programs executed by the vehicle diagnosing apparatus request data from the electronic control unit, such data requests can be sent all together to the electronic control unit at one time and the data can be received at one time from the electronic control unit. Communication loads on the vehicle diagnosing apparatus and the electronic control unit can thus be smaller and the processing sequence can be carried out more efficiently than in the case where the diagnostic programs request data from the electronic control unit separately.

After the communication unit has received the request for requesting the electronic control unit to send first data, from the first diagnostic unit, when the communication unit has not received the request for requesting the electronic control unit to send second data, from the second diagnostic unit within a predetermined period, the communication unit may request the electronic control unit to send the first data, and after having received the first data, when the communication unit has received the request for requesting the electronic control unit to send second data, from the second diagnostic unit, the communication unit may request the electronic control unit to send the second data. Thus, if there is no request for the second data until the first data are received, the second data are requested separately from the first data, so that the interval between the requests for the data is prevented from being unduly long, and the first and second data remain fresh.

If the first data and the second data are of the same type, then after the communication unit has received the request for requesting the electronic control unit to send first data, from the first diagnostic unit, when the communication unit has not received the request for requesting the electronic control unit to send second data, from the second diagnostic unit within a predetermined period, the communication unit may request the electronic control unit to send the first data, and after having requested the electronic control unit to send the first data and before receiving the first data, when the communication unit has received the request for requesting the electronic control unit to send second data, from the second diagnostic unit, the communication unit may send the first data to the first diagnostic unit and the second diagnostic unit after having received the first data. The data can thus quickly be sent to the second diagnostic unit, and communication loads on the vehicle diagnosing apparatus and the electronic unit can be reduced.

If the first data and the second data are of different types, then after the communication unit has received the request for requesting the electronic control unit to send first data, from the first diagnostic unit, when the communication unit has not received the request for requesting the electronic control unit to send second data, from the second diagnostic unit within a predetermined period, the communication unit may request the electronic control unit to send both the first data and the second data, and after having requested the electronic control unit to send the first data and the second data and before receiving the first data and the second data, when the communication unit has received the request for requesting the electronic control unit to send second data, from the second diagnostic unit, the communication unit may send the first data to the first diagnostic unit and send the second data to the second diagnostic unit after having received the first data and the second data. The data can thus quickly be sent to the second diagnostic unit, and communication loads on the vehicle diagnosing apparatus and the electronic unit can be reduced.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
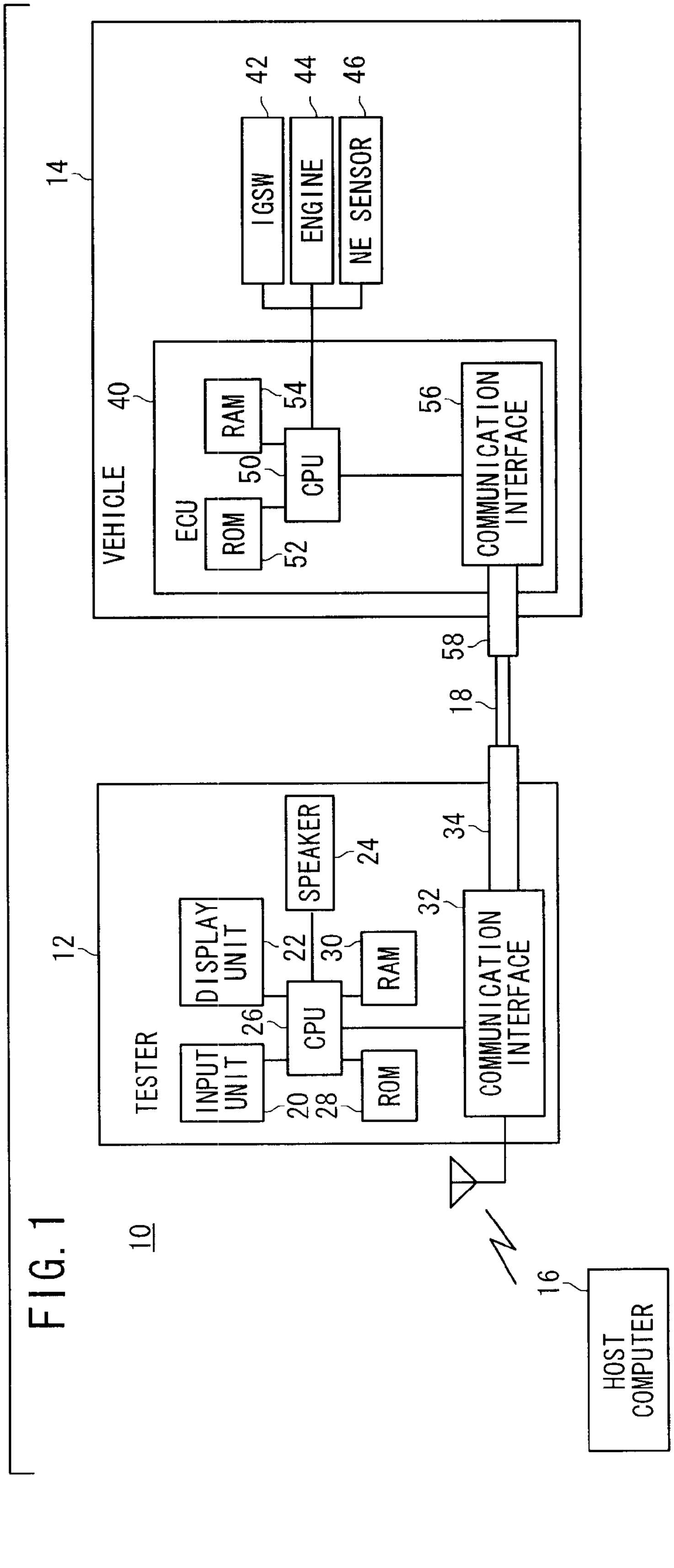
FIG. 1 is a block diagram of a vehicle diagnosing system having a tester as a vehicle diagnosing apparatus according to an embodiment of the present invention.

Configuration of a Vehicle Diagnosing Apparatus According to an Embodiment of the Present Invention FIG. 1 shows in block form a vehicle diagnosing system 10 having a tester 12 as a vehicle diagnosing apparatus according to an embodiment of the present invention. As shown in FIG. 1, the vehicle diagnosing system 10 includes, in addition to the tester 12, a vehicle 14 to be diagnosed in various ways by the tester 12 and a host computer 16. Although not shown in FIG. 1, the vehicle diagnosing system 10 includes a plurality of combinations of testers 12 and vehicles 14. In each combination, the tester 12 and the vehicle 14 are connected to each other by a cable 18 for communications therebetween. The tester 12 can communicate with the host computer 16 via a wireless link.

The tester 12 comprises an input unit 20, a display unit 22, a speaker 24, a central processing unit (CPU: first diagnostic unit, second diagnostic unit, communication unit) 26, a read-only memory (ROM) 28, a random-access memory (RAM) 30, a communication interface 32, and a connector 34.

The vehicle 14 comprises an electronic control unit (ECU) 40, an ignition switch (IGSW) 42, an engine 44, and an engine rotational speed sensor (NE sensor) 46. The ECU 40 comprises a central processing unit (CPU) 50, a read-only memory (ROM) 52, a random-access memory (RAM) 54, a communication interface 56, and a connector 58.

The ROM 28 of the tester 12 stores therein a plurality of inspection programs for use in various inspections and a driver software program for managing data requests from the inspection programs to the ECU 40. The inspection programs and the driver software program are executed by the CPU 26 of the tester 12. The driver software program can be a program for use with CAN (Controller Area Network) or KWP2000.

The host computer 16 acquires diagnostic data of the vehicles 14 from the testers 12, and stores the acquired diagnostic data as a database.

The basic configuration of the vehicle diagnosing system 10 may be the same as the configuration shown in JP 09-210865 A.

Processing Sequence of a Driver Software Program

Figure 2:
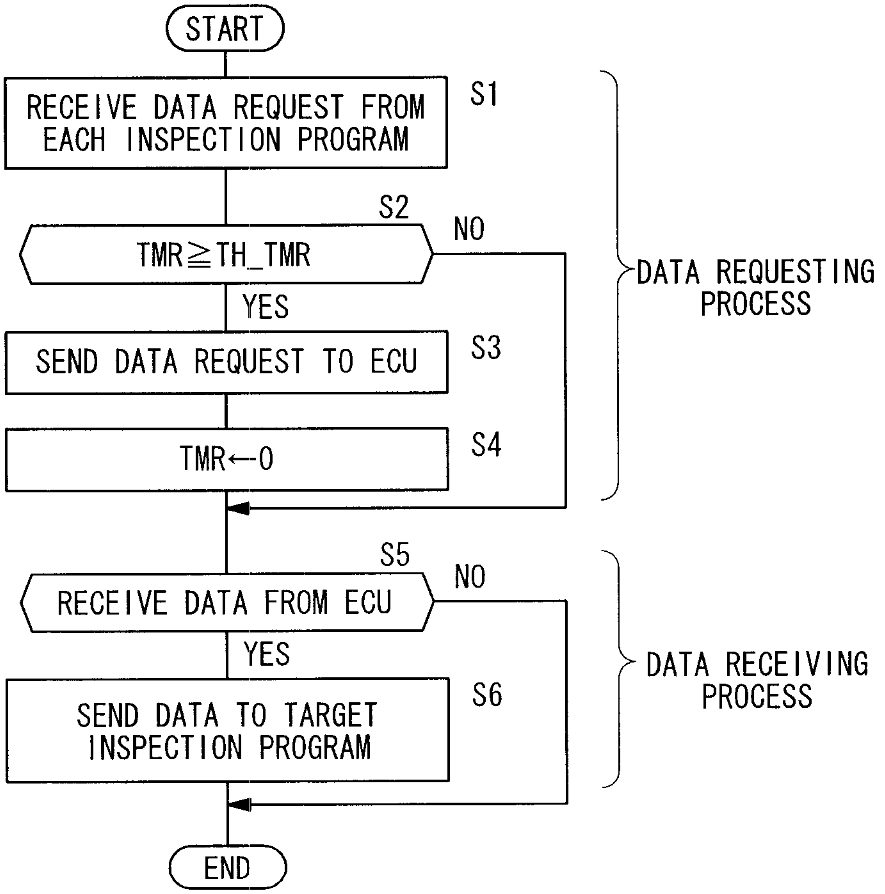
FIG. 2 is a flowchart of a processing sequence of a driver software program executed by a CPU of the tester according to the embodiment.

FIG. 2 is a flowchart of a processing sequence of a driver software program executed by the CPU 26 of the tester 12 according to the present embodiment. Steps S1 through S4 of the processing sequence shown in FIG. 2 represent a process of requesting data from the ECU 40 of the vehicle 14 by the CPU 26 of the tester 12 (data requesting process), and steps S5, S6 thereof represent a process of receiving data from the ECU 40 by the CPU 26 (data receiving process). Steps S1 through S6 are performed in a period ranging from several tens of nanoseconds to several tens of microseconds and are repeated many times, for example.

In step S1, the CPU 26 (driver software program) of the tester 12 receives a data request for the ECU 40 of the vehicle 14 from each inspection program. The received data request is temporarily stored, together with the identifier of the inspection program which has sent the data request, in the RAM 30 according to the driver software program.

In step S2, the CPU 26 (driver software program) determines whether or not a timer value TMR [μsec] is equal to or greater than a threshold value TH_TMR [μsec]. The timer value TMR is counted by a timer, not shown, and increases with time immediately after the processing sequence shown in FIG. 2 has started. The threshold value TH_TMR defines a period at which the CPU 26 sends a data request to the ECU 40 (data request period), and is of a fixed value according to the present embodiment.

If the timer value TMR is not equal to or greater than the threshold value TH_TMR (S2: NO), then control jumps to step S5. If the timer value TMR is equal to or greater than the threshold value TH_TMR (S2: YES), then the CPU 26 (driver software program) sends the data request received from each inspection program in the present data request period to the ECU 40 of the vehicle 14 in step S3. At this time, the data request temporarily stored in the RAM 30 and the identifier of the inspection program which has sent the data request remain stored in the RAM 30. In step S4, the CPU 26 (driver software program) resets the timer value TMR.

In step S5, the CPU 26 (driver software program) confirms whether it has received data from the ECU 40 or not. The data correspond to the data request in a previous data request period. If the CPU 26 has received data from the ECU 40 (S5: YES), then the CPU 26 (driver software program) sends the received data to the inspection program which has requested the data (target inspection program) in step S6. The inspection program which has received the data inspects the vehicle 14 based on the received data. If the CPU 26 has not received data from the ECU 40 (S5: NO), then the CPU 26 (driver software program) puts an end to the processing sequence shown in FIG. 2. The processing sequence shown in FIG. 2 is repeated until each inspection program ends its inspection process.

Comparison Between the Present Embodiment and a Comparative Example

Figure 3:
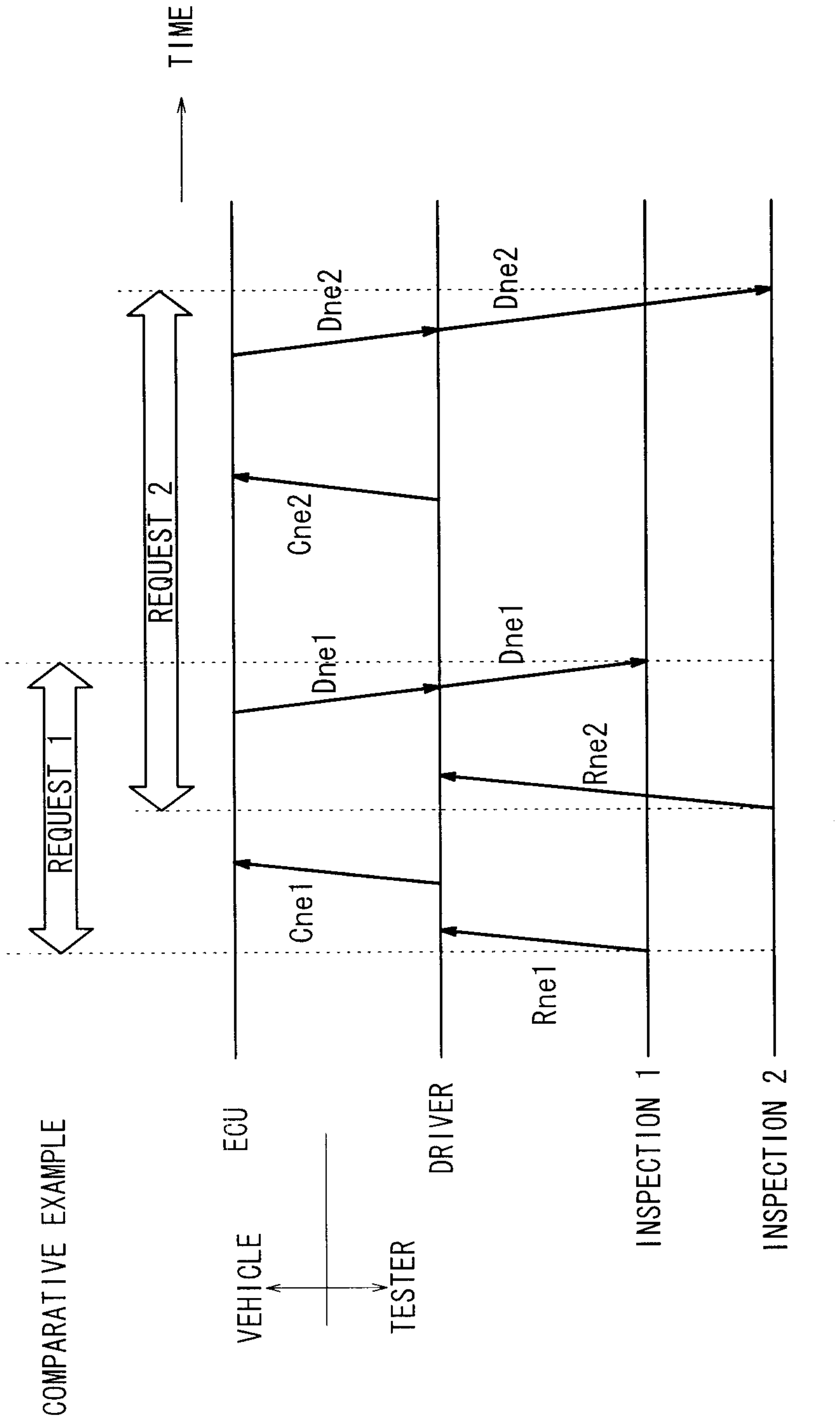
FIG. 3 is an explanatory diagram showing an example of a processing sequence of a driver software program according to a comparative example.
Figure 4:
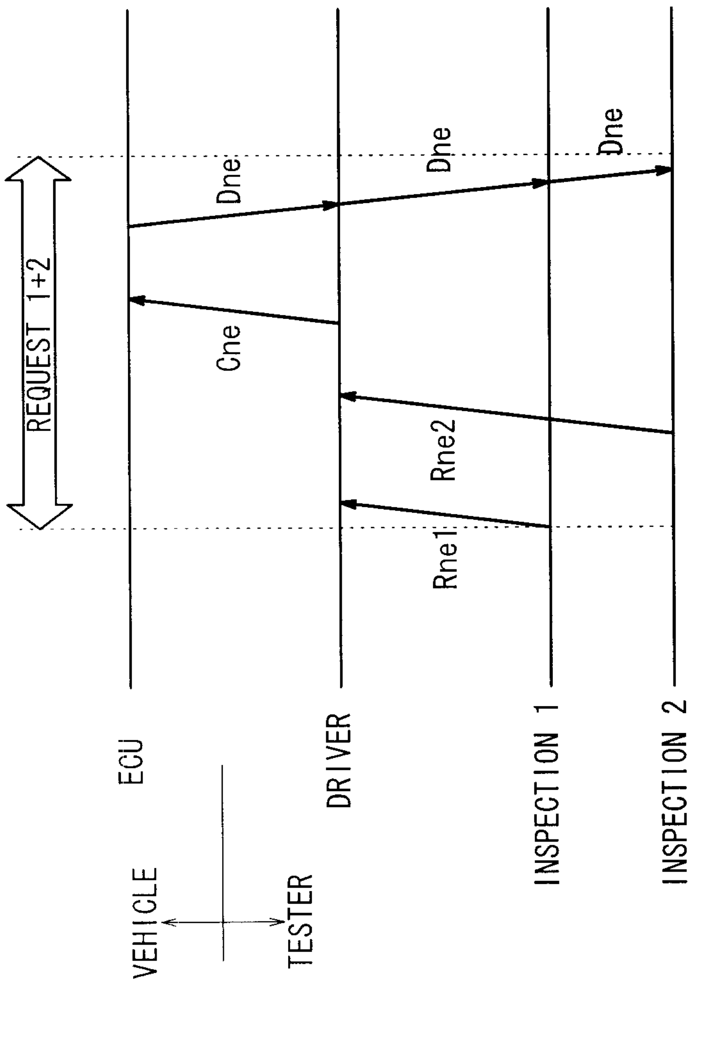
FIG. 4 is an explanatory diagram showing a first example of the processing sequence of the driver software program according to the embodiment.
Figure 5:
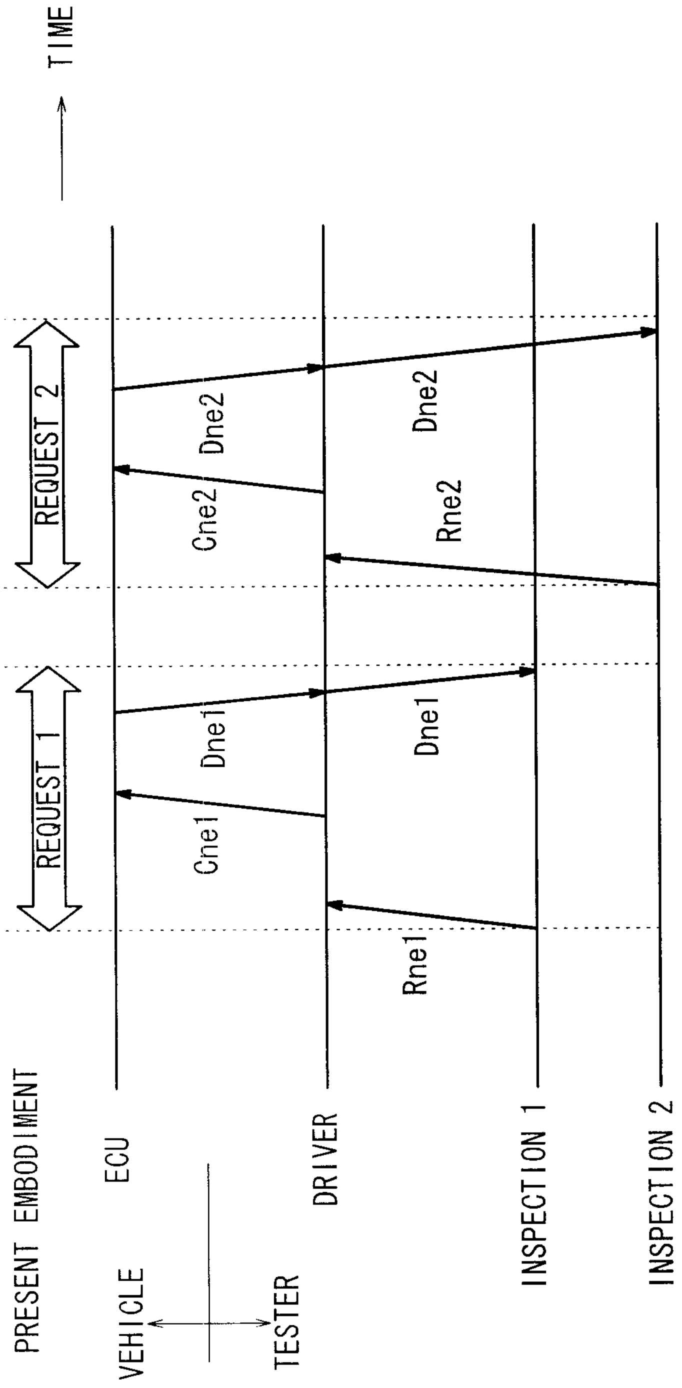
FIG. 5 is an explanatory diagram showing a second example of the processing sequence of the driver software program according to the embodiment.

FIG. 3 is a diagram showing an example of a processing sequence of a driver software program according to a comparative example. The driver software program according to the comparative example sends a data request (sends a data transmission command) to the ECU 40 immediately when any one of the inspection programs makes a data request, and the driver software program holds a next data request until it receives data corresponding to the data request. FIG. 4 is a diagram showing a first example of the processing sequence of the driver software program according to the embodiment, and FIG. 5 is a diagram showing a second example of the processing sequence of the driver software program according to the embodiment. The first example represents a process wherein there are two data requests Rne1, Rne2 in a certain data request period, and the second example represents a process wherein there data requests Rne1, Rne2 in respective different data request periods.

According to the comparative example, as shown in FIG. 3, when a driver software program (simply described as “DRIVER” in FIG. 3 as well as FIGS. 4 through 7 and 10) receives a data request Rne1 for an engine rotational speed NE [rpm] from an inspection program 1 (simply described as “INSPECTION 1” in FIG. 3 as well as FIGS. 4 through 7 and 10), the driver software program immediately sends a data transmission command Cne1 corresponding to the data request Rne1 to the ECU 40. Thereafter, even when the driver software program according to the comparative example receives a data request Rne2 for an engine rotational speed NE from an inspection program 2 (simply described as “INSPECTION 2” in FIG. 3 as well as FIGS. 4 through 7 and 10), the driver software program does not send a data transmission command Cne2 corresponding to the data request Rne2 to the ECU 40 until the driver software program receives and processes data Dne1 of the engine rotational speed NE corresponding to the data transmission command Cne1.

When the driver software program receives the data Dne1 of the engine rotational speed NE corresponding to the data transmission command Cne1, the driver software program sends the data Dne1 to the inspection program 1. Thereafter, the driver software program according to the comparative example sends the data transmission command Cne2 corresponding to the data request Rne2, which has been held, to the ECU 40. When the driver software program receives data Dne2 of the engine rotational speed NE corresponding to the data transmission command Cne2, the driver software program sends the data Dne2 to the inspection program 2.

According to the comparative example shown in FIG. 3, as described above, even when the driver software program receives the data request Rne2 from the inspection program 2, it holds the data transmission command Cne2 until it receives and processes the data Dne1. Therefore, the processing of the data request Rne2 is delayed. Also, the tester 12 sends two data transmission commands to the ECU 40, and the ECU 40 sends data twice to the tester 12.

According to the present embodiment shown in FIG. 4, even if the driver software program receives the data request Rne1 from the inspection program 1, the driver software program further receives other data requests in the same data request period. More specifically, in FIG. 4, the driver software program receives the data request Rne2 from the inspection program 2 in the same data request period as the data request Rne1 from the inspection program 1. Then, the driver software program sends a data transmission command Cne which corresponds to both the data requests Rne1, Rne2 from the tester 12 to the ECU 40.

When the driver software program according to the present embodiment receives data Dne of the engine rotational speed NE corresponding to the data transmission command Cne, the driver software program sends the received data Dne to both the inspection programs 1, 2.

As shown in FIG. 5, after the driver software program according to the present embodiment has received the data request Rne1 from the inspection program 1, it sends the data transmission command Cne1 corresponding only to the data request Rne1 if it receives no other data request in the same data request period. When the driver software program receives the data Dne1 in response to the data transmission command Cne1 from the ECU 40, it sends the received data Dne1 to the inspection program 1.

Then, when the driver software program receives another data request Rne2 in another data request period, it sends a data transmission command Cne2 different from the data transmission command Cne1 to the ECU 40. When the driver software program receives data Dne2 in response to the data transmission command Cne2 from the ECU 40, it sends the received data Dne2 to the inspection program 2.

According to the first example of the present embodiment shown in FIG. 4, the driver software program sends both the data requests Rne1, Rne2 all together as the data transmission command Cne, from the tester 12 to the ECU 40. The ECU 40 sends the data Dne in response to the data transmission command Cne to the tester 12. Consequently, the processing of the data request Rne2 is accelerated. The driver software program sends one data transmission command from the tester 12 to the ECU 40, and sends data once from the ECU 40 to the tester 12. Accordingly, the communication loads on the tester 12 and the ECU 40 are reduced, and the processes that are carried out by the tester 12 and the ECU 40 are made efficient.

According to the second example of the present embodiment shown in FIG. 5, if the data request Rne2 is not received in the same data request period as the data request Rne1, but in a subsequent data request period, then the driver software program sends the data transmission command Cne2 corresponding to the data request Rne2 separately from the data transmission command Cne1 corresponding to the data request Rne1. Consequently, the interval between the data transmission commands is prevented from becoming unduly long, and the data Dne1, Dne2 remain fresh.

Advantages of the Present Embodiment

According to the first example of the present embodiment shown in FIG. 4, as described above, when both the inspection programs 1, 2 executed by the tester 12 request the ECU 40 for the data of the engine rotational speed NE, the driver software program can send the data transmission command Cne to the ECU 40 at one time and receive the data from the ECU 40 at one time. Therefore, the communication loads on the tester 12 and the ECU 40 are made smaller, and the processes that are carried out by the tester 12 and the ECU 40 are made more efficient, than if the inspection programs 1, 2 separately send, to the ECU 40, respective requests to send the data of the engine rotational speed NE. Although there are available various standards such as CAN, KWP2000, etc. for the communication process between the tester 12 and the ECU 40, since the driver software program carries out the above processing sequence, the principles of the present invention are applicable regardless of the communication process standards and the communication rate that are employed.

According to the second example of the present embodiment shown in FIG. 5, as described above, if the CPU 26 (driver software program) of the tester 12 which has received the data request Rne1 from the inspection program 1 has not received the data request Rne2 from the inspection program 2 in the same data request period as the data request Rne1, the CPU 26 (driver software program) sends the data transmission command Cne1 corresponding to the data request Rne1 to the ECU 40, and thereafter sends the data transmission command Cne2 corresponding to the data request Rne2 to the ECU 40. If the data request Rne2 is not received in the same data request period as the data request Rne1, but in a subsequent data request period, then the CPU 26 (driver software program) sends the data transmission command Cne2 corresponding to the data request Rne2 separately from the data transmission command Cne1 corresponding to the data request Rne1. Consequently, the interval between the data transmission commands is prevented from becoming unduly long, and the data Dne1, Dne2 remain fresh.

Modifications

The present invention is not limited to the above embodiment, but various changes and modifications may be made within the scope of the invention. Examples of such changes and modifications will be described below.

Figure 6:
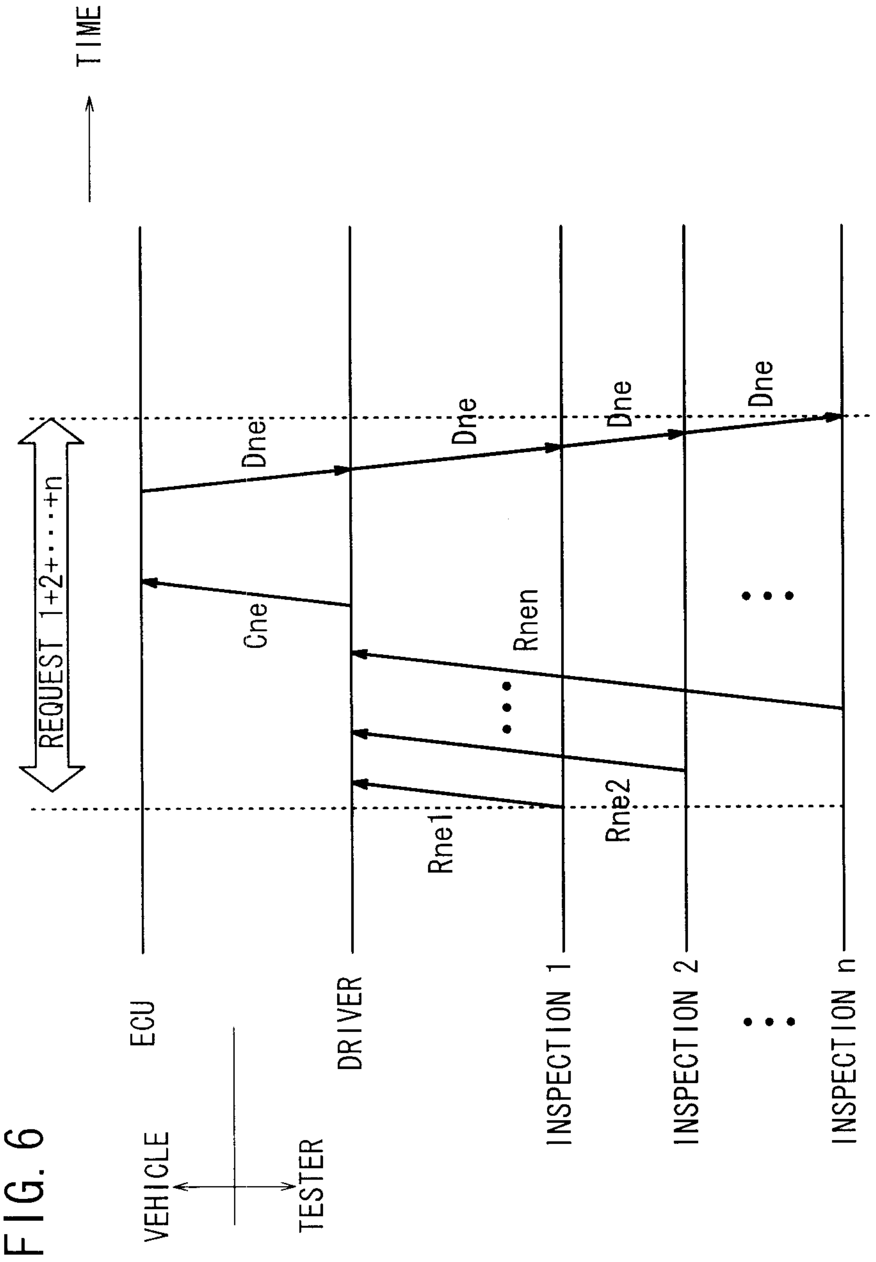
FIG. 6 is an explanatory diagram showing a first modification of the first example of the processing sequence shown in FIG. 4.

In the above embodiment (FIGS. 4 and 5), the data requests Rne1, Rne2 from the two inspection programs 1, 2 have been described. However, as shown in FIG. 6, data requests Rne1, Rne2, . . . , Rnen from three or more inspection programs 1, 2, . . . , n can be dealt with.

Figure 7:
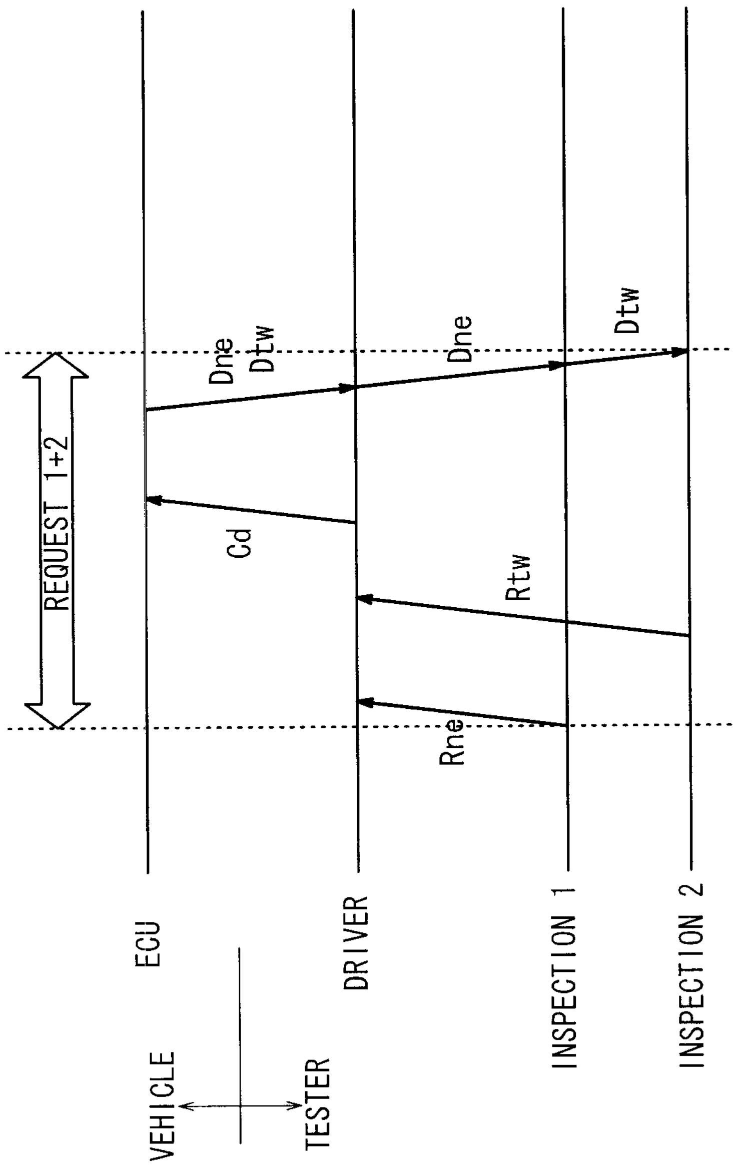
FIG. 7 is an explanatory diagram showing a second modification of the first example of the processing sequence shown in FIG. 4.

In the above embodiment, each of the data requests Rne1, Rne2 requests data of the engine rotational speed NE. However, as shown in FIG. 7, the CPU 26 (driver software program) may receive a data request Rne for requesting the engine rotational speed NE and a data request Rtw for a water temperature Tw [° C.], and send a data transmission command Cd corresponding to both the data requests Rne, Rtw from the tester 12 to the ECU 40.

Figure 8:
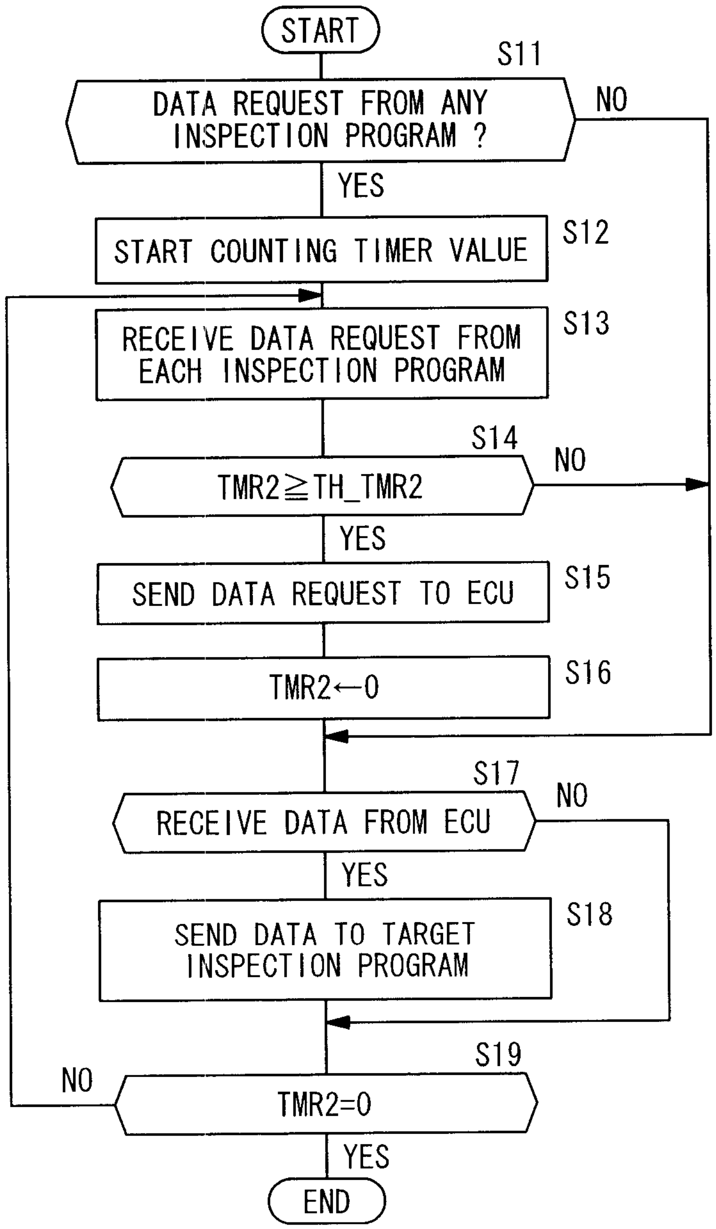
FIG. 8 is a flowchart of a first modification of the processing sequence shown in FIG. 2.

In the above embodiment, the processing sequence shown in FIG. 2 is carried out. However, a first modification of the processing sequence may be carried out as shown in FIG. 8. According to the first modification, data request periods are not provided at a constant interval, but further data requests are received for a given time (threshold value TH_THR2) after a first data request. In the first modification shown in FIG. 8, steps S11 through S19 are performed in a period ranging from several tens of nanoseconds to several tens of microseconds and are repeated many times, for example.

In step S11, the CPU 26 (driver software program) of the tester 12 determines whether it has received a data request from any one of the inspection programs or not. If the CPU 26 (driver software program) has received a data request (S11: YES), then control goes to step S12. If the CPU 26 (driver software program) has not received a data request (S11: NO), then control jumps to step S17.

In step S12, the CPU 26 (driver software program) starts counting a timer value TMR2 [μsec]. The timer value TMR2 is counted by a timer, not shown, and increases with time from step S12. The timer value TMR2 stops increasing when it is reset in step S16.

In step S13, the CPU 26 (driver software program) receives data requests from the inspection programs. Specifically, the CPU 26 (driver software program) receives further data requests from the inspection programs including the inspection program which has sent the data request in step S11. The inspection program which has sent the data request in step S11 is included in the inspection programs in step S13 because the inspection program which has sent the data request in step S11 may have a different type of data request to be sent.

In step S14, the CPU 26 (driver software program) determines whether or not the timer value TMR2 is equal to or greater than a threshold value TH_TMR2. The threshold value TH_TMR2 corresponds to the data request period according to the above embodiment, but is different from the data request period in that it defines a period from the first data request or from a first data request after a data transmission command has been sent to the ECU 40 (hereinafter, both data requests will be referred to as "first data request"). If the timer value TMR2 is equal to or greater than the threshold value TH_TMR2 (S14: YES), then control goes to step S15. If the timer value TMR2 is not equal to or greater than the threshold value TH_TMR2 (S14: NO), then control jumps to step S17.

In step S15, the CPU 26 (driver software program) sends a data transmission command corresponding to all the data requests received in steps S11, S13 to the ECU 40. In step S16, the CPU 26 (driver software program) resets the timer value TMR2 and holds it as zero. The CPU 26 (driver software program) holds the timer value TMR2 as zero until control goes through step S12 in a next cycle. Therefore, the timer value TMR2 can be held as zero until a first data request is received after the CPU 26 (driver software program) has sent a data transmission command to the ECU 40.

Steps S17, S18 are the same as steps S5, S6 shown in FIG. 2.

In step S19, the CPU 26 (driver software program) determines whether the timer value TMR2 is zero or not. If the timer value TMR2 is not zero (S19: NO), then it means that the timer TMR2 has started being counted in step S12, but is not reset yet in step S16. Therefore, the CPU 26 (driver software program) is not in a state of "YES" in step S14, i.e., the CPU 26 is in a state of receiving a further data request while repeating step S13 and step S14 (NO). In order to receive a further data request, control goes back to step S13. If the timer value TMR2 is zero (S19: YES), then it means that the CPU 26 (driver software program) is receiving a first data request. Thus, the processing sequence shown in FIG. 8 is ended. The processing sequence shown in FIG. 8 is repeated until each inspection program ends its inspection process.

According to the first modification, the period for receiving a further data request is started from the first data request. Therefore, when the first data request and a further data request are close to each other in timing, it is possible to reliably send a data transmission command corresponding to both the data requests to the ECU 40.

Figure 9:
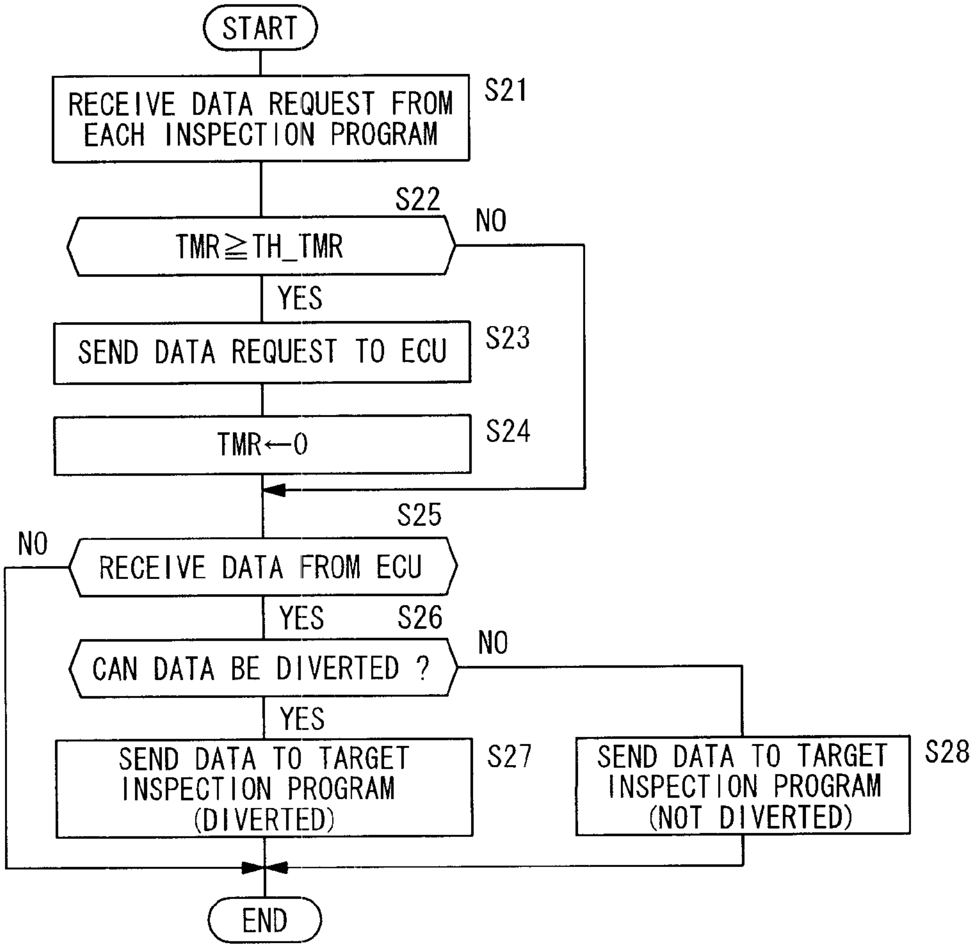
FIG. 9 is a flowchart of a second modification of the processing sequence shown in FIG. 2.

FIG. 9 is a flowchart of a second modification of the processing sequence shown in FIG. 2, which may be used instead of the first modification shown in FIG. 8. The second modification is basically the same as the processing sequence shown in FIG. 2, but is different therefrom in that immediately after a data transmission command corresponding to a certain data request (first data request) has been sent from the tester 12 to the ECU 40, when there is a data request (second data request) for requesting the same type of data as the data requested by the first data request, the data (first data) corresponding to the first data request are diverted as data in response to the second data request. In the second modification shown in FIG. 9, steps S21 through S28 are performed in a period ranging from several tens of nanoseconds to several tens of microseconds, for example, and are repeated many times.

Figure 10:
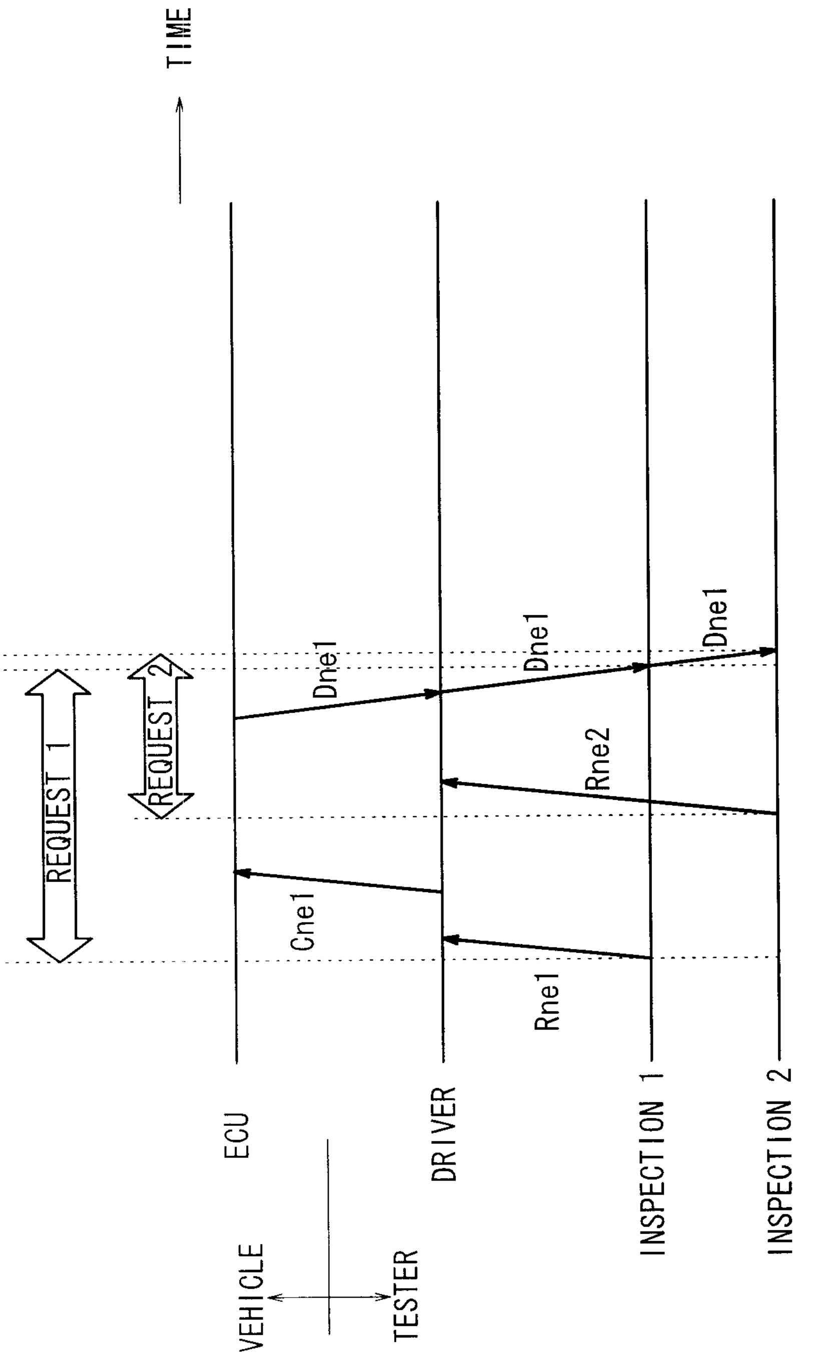
FIG. 10 is an explanatory diagram showing an example of a processing sequence of a driver software program which carries out the second modification shown in FIG. 9.

FIG. 10 is a diagram showing an example of a processing sequence of a driver software program which carries out the second modification shown in FIG. 9.

Steps S21 through S25 shown in FIG. 9 are the same as steps S1 through S5 shown in FIG. 2. If no data are received from the ECU 40 (S25: NO), the present cycle is ended, and control goes back to step S21. If data are received from the ECU 40 (S25: YES), then control goes to step S26.

In step S26, the CPU 26 (driver software program) determines whether the data received from the ECU 40 can be diverted or not. The term "diverted" means that immediately after a data transmission command Cne1 corresponding to a certain data request (a first data request Rne1 in FIG. 10) has been sent from the tester 12 to the ECU 40, when there is a second data request Rne2 for requesting the same engine rotational speed NE as the engine rotational speed NE requested by the first data request Rne1, the data (first data Dne1) corresponding to the first data request Rne1 are used as data in response to the second data request Rne2.

If the data (the first data Dne1 shown in FIG. 10) can be diverted (S26: YES), then the CPU 26 (driver software program) diverts the data and sends the data to target inspection programs in step S27. For example, in FIG. 10, the CPU 26 (driver software program) does not send a data transmission command corresponding to the second data request Rne2 to the ECU 40, but sends the first data Dne1 to both the inspection programs 1, 2.

If the data (the first data Dne1 shown in FIG. 10) cannot be diverted (S26: NO), then the CPU 26 (driver software program) does not divert the data, but sends the data to a target inspection program in step S28. Specifically, the CPU 26 (driver software program) sends the data received from the ECU 40 only to the inspection program which has sent the data request on which the data transmission command Cne1 is based, i.e., in FIG. 10, the inspection program 1 which has sent the first data request Rne1.

In the second modification, both the data request Rne1 from the inspection program 1 and the data request Rne2 from the inspection program 2 request for data of the engine rotational speed NE. After the CPU 26 (driver software program) of the tester 12 has received the data request Rne1 from the inspection program 1, if the CPU 26 (driver software program) has not received the data request Rne2 from the inspection program 2 in the same data request period as the data request Rne1, the CPU 26 (driver software program) sends the data transmission command Cne1 corresponding to the data request Rne1 to the ECU 40. After having sent the data transmission command Cne1 to the ECU 40, when the CPU 26 (driver software program) receives the data request Rne2 from the inspection program 2 prior to the reception of the data Dne1 in response to the data transmission command Cne1, the CPU 26 (driver software program) sends the data Dne1 to the inspection programs 1, 2 after it has received the data Dne1. Consequently, the data can quickly be sent to the inspection program 2, and communication loads on the tester 12 and the ECU 40 are reduced.

The second modification shown in FIG. 9 is applicable to data requests for different types of data. For example, if there is a data request for either one of the engine rotational speed NE and the water temperature Tw, then the CPU 26 (driver software program) sends a data transmission command for both the engine rotational speed NE and the water temperature Tw to the ECU 40. When the CPU 26 (driver software program) receives the engine rotational speed NE and the water temperature Tw from the ECU 40, the CPU 26 (driver software program) can divert either one of the engine rotational speed NE and the water temperature Tw.

Although certain preferred embodiments of the present invention have been shown and described in detail, it should be understood that various changes and modifications may be made therein without departing from the scope of the appended claims.

What is claimed is:

1. A vehicle diagnosing apparatus for communicating with an electronic control unit mounted on a vehicle from outside the vehicle and determining whether or not the vehicle has passed with respect to a plurality of diagnostic items based on various data transmitted from the electronic control unit, the vehicle diagnosing apparatus comprising:

a first diagnostic unit for executing a first diagnostic program;

a second diagnostic unit for executing a second diagnostic program which is different from the first diagnostic program; and a communication unit for communicating with the electronic control unit;

wherein the first diagnostic unit, the second diagnostic unit, and the communication unit are located outside of the vehicle, the first diagnostic unit is configured to send, to the communication unit, a request for requesting the electronic control unit to send first data, and the second diagnostic unit is configured to send, to the communication unit, a request for requesting the electronic control unit to send second data, and the communication unit is configured such that, when the communication unit receives the request for requesting the electronic control unit to send first data from the first diagnostic unit, and the communication unit receives the request for requesting the electronic control unit to send second data from the second diagnostic unit within a predetermined period of receiving the request for requesting the electronic control unit to send first data from the first diagnostic unit, if the first data and the second data are of the same type, then the communication unit sends a single request to the electronic control unit requesting the electronic control unit to send the same type of data, and sends the same type of data received from the electronic control unit, to the first diagnostic unit and the second diagnostic unit, and if the first data and the second data are of different types, then the communication unit sends a single request to the electronic control unit requesting the electronic control unit to send the first data and the second data, receives the first data and the second data all together in a single transmission from the electronic control unit, sends the received first data to the first diagnostic unit, and sends the received second data to the second diagnostic unit.

2. A vehicle diagnosing apparatus according to claim 1, wherein the communication unit is configured such that, when the communication unit receives the request for requesting the electronic control unit to send the first data from the first diagnostic unit, and the communication unit does not receive the request for requesting the electronic control unit to send the second data from the second diagnostic unit within the predetermined period, the communication unit sends a single request to the electronic control unit requesting the electronic control unit to send, among the first data and the second data, only the first data, and after having received the first data, when the communication unit receives the request for requesting the electronic control unit to send the second data from the second diagnostic unit, the communication unit sends a single request to the electronic control unit requesting the electronic control unit to send, among the first data and the second data, only the second data.

3. A vehicle diagnosing apparatus according to claim 1, wherein the first data and the second data are of the same type, the communication unit is configured such that, when the communication unit receives the request for requesting the electronic control unit to send the first data from the first diagnostic unit, and the communication unit does not receive the request for requesting the electronic control unit to send the second data from the second diagnostic unit within the predetermined period, the communication unit sends a single request to the electronic control unit requesting the electronic control unit to send the first data; and after having requested the electronic control unit to send the first data and before receiving the first data, when the communication unit receives the request for requesting the electronic control unit to send the second data from the second diagnostic unit, the communication unit sends the first data to the first diagnostic unit and the second diagnostic unit after receiving the first data.

4. A vehicle diagnosing apparatus according to claim 1, wherein the first data and the second data are of different types;

the communication unit is configured such that, when the communication unit receives the request for requesting the electronic control unit to send the first data from the first diagnostic unit, and the communication unit does not receive the request for requesting the electronic control unit to send the second data from the second diagnostic unit within the predetermined period, the communication unit sends the single request to the electronic control unit requesting the electronic control unit to send both the first data and the second data; and after having requested the electronic control unit to send the first data and the second data and before receiving the first data and the second data, when the communication unit receives the request for requesting the electronic control unit to send the second data from the second diagnostic unit, the communication unit sends the first data to the first diagnostic unit and sends the second data to the second diagnostic unit after receiving the first data and the second data.

5. A vehicle diagnosing apparatus according to claim 1, wherein the communication unit is configured such that, when the communication unit receives the request for requesting the electronic control unit to send first data from the first diagnostic unit, the communication unit requests the electronic control unit to send the first data only after the predetermined period passes following receipt of the request for requesting the electronic control unit to send first data from the first diagnostic unit.

* * * * *